United States Patent [19]

D'Aluisio et al.

[11] Patent Number: 5,020,819
[45] Date of Patent: Jun. 4, 1991

[54] REPLACEABLE DERAILLEUR HANGER

[75] Inventors: Christopher D'Aluisio, Georgetown; David Graham, Danbury, both of Conn.

[73] Assignee: Cannondale Corporation, Georgetown, Conn.

[21] Appl. No.: 415,702

[22] Filed: Oct. 2, 1989

[51] Int. Cl.⁵ .................................................. B62K 25/02
[52] U.S. Cl. ........................................ 280/288; 474/116
[58] Field of Search .................. 280/274, 281.1, 288, 280/284, 288.1; 474/116

[56] References Cited

U.S. PATENT DOCUMENTS 4,856,802  8/1989  Schilplin ........................... 280/288

FOREIGN PATENT DOCUMENTS 807181   6/1951   Fed. Rep. of Germany ...... 280/288
20206   of 1897  United Kingdom ............. 280/281.1

Primary Examiner—Charles A. Marmor
Assistant Examiner—Victor E. Johnson
Attorney, Agent, or Firm—Brumbaugh, Graves, Donohue & Raymond

[57] ABSTRACT

A replaceable bicycle derailleur hanger comprises a plate-like dropout member and a plate-like hanger member. A coupling portion of the hanger member is bifurcated to form legs defining a slot, and a dropout portion of a dropout member is received in the slot with a close fit. One or more removable fasteners join the two members at their overlapping juncture.

4 Claims, 2 Drawing Sheets

REPLACEABLE DERAILLEUR HANGER

BACKGROUND OF THE INVENTION

The vast majority of bicycles currently marketed for recreational bicycling by older children and adults have a multi-speed drive that includes a freewheel associated with the rear wheel and a derailleur to shift the drive chain among the sprocket wheels of the freewheel. The derailleur is attached to a hanger that is part of a plate that also includes the rear wheel axle dropout. The dropout/hanger plate is usually welded or brazed to the chainstay tube or to both the chainstay and seat stay tubes of the bicycle frame and, thus, is a permanent part of the frame.

The hanger portion of the dropout/hanger plate projects downwardly below the dropout, and the derailleur extends generally downwardly even farther. The derailleur, therefore, is quite exposed to impacts from objects on the ground, especially rocks or roadway curbs. Occasionally, the hanger portion of the dropout/hanger plate is broken off, commonly at the bolt hole where the derailleur is attached to it and which inherently presents the minimum cross-sectional area of the hanger portion and is therefore a zone of weakness, by an impact on the derailleur of an object along the path of the bicycle. The incidence of broken dropout/hanger plates is particularly high in the case of mountain bikes, which are frequently ridden off-the-road. It is not possible, as a practical matter, to repair satisfactorily a broken dropout/hanger plate, because brazing the broken-off part to the vestigial part does not provide adequate strength. While welding is possible, the expense of preparing the pieces, making the weld, grinding it to accept the derailleur and repainting the area for appearance and protection will usually exceed the cost of a new frame. In the case of bicycles with aluminum frames, an attempt to weld the broken piece to the vestigial piece will almost certainly cause permanent thermal distortion of the chain stay and seat stay tubes of the frame adjacent the welding site and ruin the frame. Thus, a broken derailleur hanger almost always produces a bicycle frame destined for the scrap pile.

SUMMARY OF THE INVENTION

An object of the present invention is to provide a replaceable bicycle derailleur hanger, that is, a derailleur hanger that can be removed if it breaks and be replaced by a new one. To fulfill that objective presents some obstacles. For example, it is necessary to meet certain requirements of strength and stiffness within the dimensional constraints of being able to attach a conventional wheel to the dropout and a conventional derailleur to the hanger. Also, proper operation of the derailleur requires that it be located at a fairly precise location relative to the freewheel. It is desirable that the hanger be replaceable quickly and easily using simple tools. Finally, the consumer will want something that looks good.

There is provided, according to the present invention, a replaceable bicycle derailleur hanger comprising a plate-like dropout member having an attachment portion adapted to be permanently fastened to a bicycle frame adjacent the juncture of the chainstay and seat stay tubes and a dropout portion shaped in profile to form a dropout for a bicycle rear wheel axle and a plate-like hanger member having a coupling portion joined to the dropout portion of the dropout member and a hanger portion adapted to receive a chain derailleur for a bicycle freewheel. The coupling portion of the hanger member is bifurcated to define a slot, and the dropout portion of the dropout member is received with a close fit in the slot. At least one removable fastener joins the dropout and hanger members together at the juncture of the dropout portion and coupling portion thereof.

In a preferred embodiment the outward lateral face of the hanger portion of the hanger member is offset inwardly so that when the derailleur is mounted thereon, it is properly located laterally with respect to the freewheel. The thickness of the connecting portion of the dropout member is substantially equal to the combined thicknesses of the dropout portion and coupling portion of the dropout and hanger members. It is also preferred that the internal and external faces of the dropout and hanger members adjacent the juncture between them be contiguous.

One aspect of achieving high strength and stiffness in the lateral direction is the overlapping of the two members in the dropout portion of the dropout member. The rear wheel axle and hub assembly and the quick release skewer produce a clamping action that holds the members together in the overlapping areas. The clamping action supplements the fastener or fasteners in holding the members together. Another aspect of meeting the strength and stiffness requirements involves sandwiching the dropout portion of the dropout member between the bifurcated coupling portion of the hanger member. The dropout portion of the dropout member can be kept thick for supporting the vertical and lateral loads transferred from the frame to the rear wheel axle. The hanger member, on the other hand, is not subject to large loads, and the legs forming the bifurcation can be relatively thin.

Forming the juncture of the members by what is essentially a tongue and groove balances and distributes load transfers and is advantageous compared to a simple overlapping juncture. It also forms, intentionally, zones of weakness where the hanger member will fail if a sharp impact is exerted on it or on the derailleur. The weakest part of the hanger member is at the base of the slot where the legs formed by the bifurcation join the hanger portion. The lateral component of an impact on the derailleur will act with quite of bit of leverage in this weak zone. The weak zone is also at a relatively great distance from the neutral axis of bending, which means that tensile stresses due to bending will be quite high for any given impact. This is not to say that the member is intended to be weak; instead the idea is that if something is going to break, it will usually break at given zones of weakness. The permanently installed dropout member is protected by making it inherently stronger and subject to lower stresses. This point is discussed further below.

For a better understanding of the invention, reference may be made to the following description of an exemplary embodiment, taken in conjunction with the accompanying drawings.

DESCRIPTION OF THE EMBODIMENT

The embodiment is designed for a bicycle having an aluminum frame. Conventionally, the dropout/hanger for an aluminum frame is made in one piece from an aluminum plate and in lateral aspect looks very much the same as the assembly of the dropout member 10 and the hanger member 12 of the embodiment. The overall shape of the dropout/hanger in lateral profile is roughly that of a "L" turned 90° (see FIG. 5). The dropout for the rear axle is a notch 20 that opens downwardly and a little forwardly located where the legs of the "L" meet. A hole 38 in the downwardly extending leg of the "L" receives a bolt (not shown) by which the derailleur is fastened to the hanger.

Figure 1:
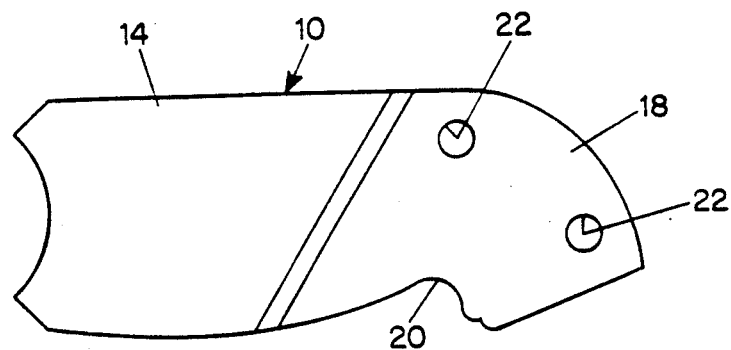
FIGS. 1 and 2 are internal side elevational and bottom plan views, respectively, of the dropout member.
Figure 2:
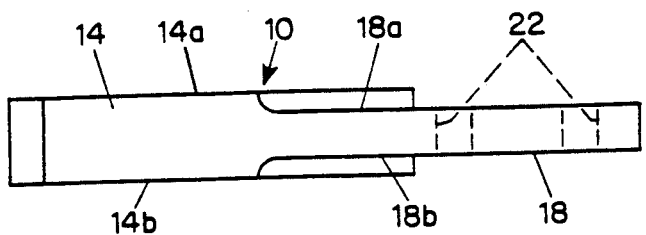

In the embodiment the dropout member 10 (FIGS. 1 and 2) has an attachment portion 14 adapted to be welded to the frame at the juncture of the chain-stay tube 16 and the seat stay tube 17 (FIG. 5) and a hook-like dropout portion 18 having a notch 20 that opens downwardly and slightly forwardly and accepts the rear wheel axle (not shown). The attachment portion 14 is thicker than the dropout portion 18, thereby presenting an inset face 18a, 18b on each lateral aspect of the dropout portion. The junctures of the faces 18a, 18b with the faces 14a, 14b of the attachment portion are radiused (see FIG. 2) to avoid stress risers. There are two holes 22 in the dropout portion 18 for machine screws 33 that connect the hanger member 12 to the dropout member 10.

Figure 3:
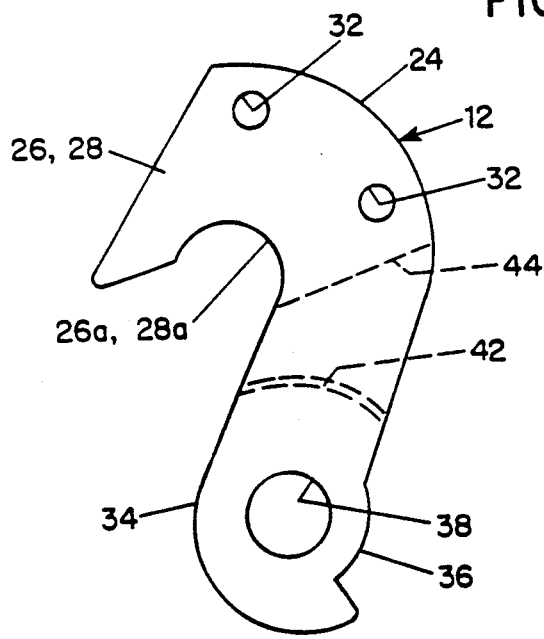
FIGS. 3 and 4 are internal side elevational and front end elevational views, respectively, of the hanger member.
Figure 4:
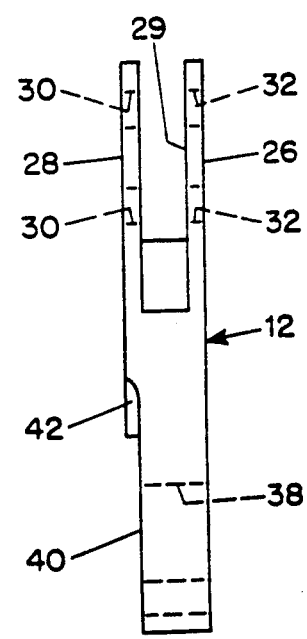

The hanger member 12 (FIGS. 3 and 4) has a bifurcated coupling portion 24 composed of two leg portions 26, 28 that define a slot 29 between them. In lateral profile the leg portions 26, 28 match each other. Matching notches 26a, 28a of the hanger member 12 are deeper than the dropout notch 20 (see FIG. 5) so that the rear wheel axle bears against only the dropout notch 20. It is considered undesirable to try to match the notches 20, 26a and 28a, because a good enough match for uniform load transfer is very difficult to attain when a hanger member is replaced.

The outward leg 28 of the hanger member 12 has two plain holes 30 that match the holes 22 in the drop out member 10, and the inward leg 26 has two correspondingly located tapped holes 32. The machine screws 33 (FIG. 5) pass through the respective holes 30 and 22 and thread into the tapped holes 32 to fasten the hanger member 12 to the dropout member 10. While two screws are desirable, one screw will work, because the base of the slot 29 between the legs 26, 28 of the hanger member engages the end of the dropout member 10 along the line 44 (FIG. 5) and fully stabilizes the attachment endwise, and the skewer clamps the members securely, as mentioned above.

The hanger member 12 has a hanger portion 34, the rear aspect 36 of which is of a standard shape to register with the mounting bracket of a conventional derailleur. A tapped hole 38 accepts the standard threaded fastener of the derailleur.

For primarily aesthetic reasons the embodiment is designed so that the lateral faces of the leg portions 26 and 28 of the hanger member 12 are contiguous with the lateral faces of the connector portion 14 of the dropout member 10. However, this means also that the connector portion is thicker and therefore stronger, and it also means that there is continuity for easier cleaning rather than an offset where dirt and grease can collect. The dropout portion 18 of the hanger member 10 is designed to carry the major part of the loads on the rear axle. Therefore, the assembled dropout portion is thicker than the conventional one-piece dropout/hanger, and the outward lateral face of the hanger member lies farther out from the freewheel than it should for proper operation of the derailleur. To correct that dimensional defect, the outward lateral face 40 of the hanger portion 34 is offset inwardly to provide the proper lateral location for the derailleur. The margin of the offset face 40 is indicated by the line 42 and is radiused to avoid stress risers.

In order to make rear wheels set up with quick release skewers adjusted for the conventional one-piece dropouts compatible with the present invention, it is desirable to make the left rear dropout thinner than the conventional left dropout so that the total of the thicknesses of the left dropout and the dropout/hanger assembly of the present invention is equal to the total of the thickness of conventional left and right dropouts. This preference is particularly strong in the case of racing bicycles.

Structurally, the dropout portion 18 of the dropout member 10 is dimensioned to bear the loads of the bicycle and its rider and other "live" loads carried by the bicycle. The hanger member is intentionally the bifurcated part of the tongue-and-groove juncture; a reversal would result in increased bending stresses in the dropout member 10, all other things being equal.

The weakest parts of the hanger member 12 are at the junctures (the dashed line 44) of the leg portions 26, 28, which are relatively thin, with the hanger portion 34. For example, each leg 26, 28 may have a thickness of 0.070 in. The combined thickness of the legs 26, 28 (e.g., 0.140 in.) is substantially less than the thickness of the hanger portion 18 of the hanger member, which may be, for example, 0.178 in. thick. Also, the junctures 44 are some distance from the distal extremity of the derailleur, the location where impacts are most likely to occur. Therefore, an impact force on the derailleur may be conducted with considerable leverage with respect to the junctures 44 of the legs 26, 28 with the hanger portion 34. Finally, the outer surfaces of those junctures are at a relatively great distance from the neutral axis of bending of the hanger member with respect to lateral loads. The combined effect is that the most likely form of failure of the dropout/hanger is by fracture due to tensile stress resulting from bending at the juncture of one of the legs 26, 28 with the hanger portion 34 (along the line 44 of FIG. 3). Such a bending load can be in either direction, depending on the direction of the impact. It is, indeed, intended that a fracture of the dropout/hanger occur in the hanger component 12, because it is the part that can be replaced—a fracture of the dropout member 10 cannot easily be repaired, and the dropout member 10 cannot, as a practical matter, be replaced. If the hanger member breaks, it is a simple matter to replace it by removing the screws 33, slipping on a new hanger member 10, and replacing the screws.

Figure 5:
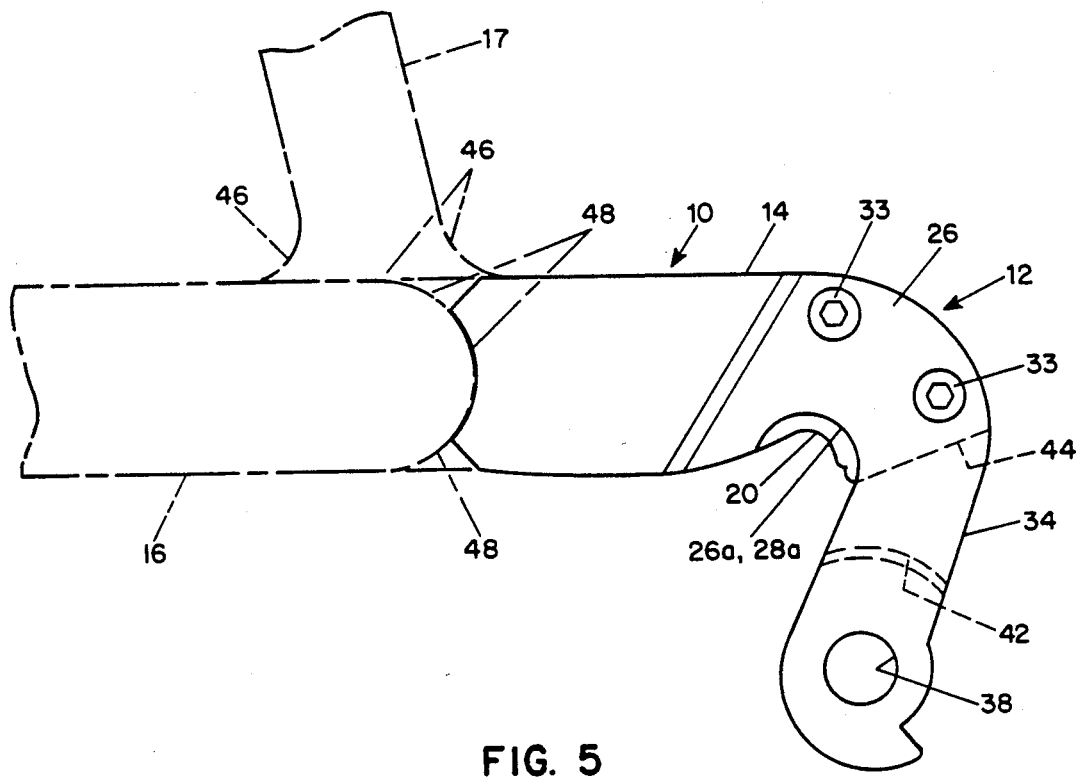
FIG. 5 is a side elevational view of the internal aspect of the assembled dropout/hanger as installed on the bicycle frame.

As shown in FIG. 5, the dropout/hanger assembly is attached to the bicycle frame adjacent the juncture of a chain stay tube 16 and the corresponding seat stay tube 17. The ends of these tubes are swaged, and the tubes and the hanger are butt-welded at their respective junctures with each other, i.e., at weldments 46 and 48.

I claim:

1. A rear wheel axle dropout and replaceable derailleur hanger assembly for a bicycle having a frame that includes a rear wheel mount comprising a plate-like dropout member having an attachment portion adapted to be permanently fastened to the bicycle frame rear wheel mount and a dropout portion shaped in profile to form a dropout for the bicycle rear wheel axle, the rear wheel axle being received by a dropout notch in the dropout portion, and a plate-like hanger member having a coupling portion joined removably to the dropout portion of the dropout member and a hanger portion adapted to receive a chain derailleur for a bicycle freewheel, with the dropout and coupling portions having a juncture therebetween, the coupling portion of the hanger member being bifurcated and having spaced-apart legs defining a slot and the dropout portion of the dropout member being received with a close fit in the slot, the spaced-apart legs of the hanger member having matching notches which are deeper than the dropout notch of the dropout portion to insure that the rear wheel axle bears against only the dropout notch, and at least one removable fastener joining the dropout and hanger members at the juncture of the dropout and coupling portions thereof.

2. A replaceable derailleur hanger according to claim 1 wherein the thickness of the dropout portion of the dropout member is substantially greater than the total of the thicknesses of the legs of the hanger member.

3. An assembly according to claim 1 wherein the coupling portion has an outward planar surface facing away from the freewheel and the hanger portion of the hanger member has an outward planar surface facing away from the freewheel that is offset inwardly toward the freewheel from the outward planar surface of the hanger portion so that when the derailleur is mounted thereon, it is properly spaced with respect to the freewheel.

4. An assembly according to claim 1 wherein the thickness of the attachment portion of the dropout member is substantially equal to the sum of the thickness of the dropout portion of the dropout member and the thicknesses of the legs of the coupling portion of the hanger member and wherein the surfaces of the attachment portion of the dropout member and the surfaces of the legs of the coupling portion of the dropout member are substantially coplanar.

* * * * *